(12) United States Patent
Lee et al.

(10) Patent No.: US 12,368,178 B2
(45) Date of Patent: Jul. 22, 2025

(54) SECONDARY BATTERY, METHOD FOR MANUFACTURING THE SECONDARY BATTERY, AND BATTERY PACK COMPRISING THE SECONDARY BATTERY

(71) Applicant: LG ENERGY SOLUTION, LTD., Seoul (KR)

(72) Inventors: Young Hoon Lee, Daejeon (KR); Mi Jung Yoo, Daejeon (KR); Woo Yong Lee, Daejeon (KR); Min Jung Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 426 days.

(21) Appl. No.: 17/632,399

(22) PCT Filed: Aug. 5, 2020

(86) PCT No.: PCT/KR2020/010333
§ 371 (c)(1),
(2) Date: Feb. 2, 2022

(87) PCT Pub. No.: WO2021/033963
PCT Pub. Date: Feb. 25, 2021

(65) Prior Publication Data
US 2022/0293996 A1 Sep. 15, 2022

(30) Foreign Application Priority Data
Aug. 20, 2019 (KR) .................. 10-2019-0102027

(51) Int. Cl.
*H01M 10/04* (2006.01)
*H01M 50/54* (2021.01)

(52) U.S. Cl.
CPC .......... *H01M 10/04* (2013.01); *H01M 50/54* (2021.01)

(58) Field of Classification Search
CPC .. H01M 10/04; H01M 50/54; H01M 10/0585; H01M 10/0413; H01M 50/536; A61B 5/256
See application file for complete search history.

(56) References Cited

U.S. PATENT DOCUMENTS

2004/0127952 A1* 7/2004 O'Phelan ............. H01M 6/005
607/36
2005/0221171 A1 10/2005 Haasl et al.
(Continued)

FOREIGN PATENT DOCUMENTS

| CN | 102195025 A | 9/2011 |
| CN | 103733417 A | 4/2014 |

(Continued)

OTHER PUBLICATIONS

Grepow, "Pouch Ring Shaped Lipo Battery", 2024, https://www.grepow.com/shaped-battery/pouch-ring-shaped-lipo-battery.html (Year: 2024).*

(Continued)

*Primary Examiner* — Nicholas A Smith
*Assistant Examiner* — Ziheng Lu
(74) *Attorney, Agent, or Firm* — Birch, Stewart, Kolasch & Birch, LLP

(57) ABSTRACT

A secondary battery, a method for manufacturing the secondary battery, and a battery pack including the secondary battery is provided. The secondary battery has a curved surface that is manufactured without a separate pressing process for forming the curved surface.

14 Claims, 14 Drawing Sheets

(56) References Cited

U.S. PATENT DOCUMENTS

| | | |
|---|---|---|
| 2006/0011963 A1 | 1/2006 | Poplett et al. |
| 2006/0012942 A1 | 1/2006 | Poplett |
| 2006/0012943 A1 | 1/2006 | Sherwood |
| 2006/0012945 A1 | 1/2006 | Doffing et al. |
| 2006/0023396 A1 | 2/2006 | Sherwood |
| 2006/0023400 A1 | 2/2006 | Sherwood |
| 2006/0061938 A1 | 3/2006 | Dombro et al. |
| 2006/0179626 A1 | 8/2006 | Poplett |
| 2006/0238959 A1 | 10/2006 | Sherwood |
| 2006/0257726 A1 | 11/2006 | Kelley et al. |
| 2006/0279907 A1 | 12/2006 | Doffing et al. |
| 2007/0014077 A1 | 1/2007 | Sherwood |
| 2007/0099194 A1 | 5/2007 | Yang et al. |
| 2007/0156197 A1 | 7/2007 | Root et al. |
| 2007/0162077 A1 | 7/2007 | Sherwood |
| 2007/0179532 A1 | 8/2007 | Root et al. |
| 2008/0155800 A1 | 7/2008 | Poplett et al. |
| 2008/0172851 A1 | 7/2008 | Doffing et al. |
| 2009/0000090 A1 | 1/2009 | Dombro et al. |
| 2009/0044404 A1 | 2/2009 | Sherwood |
| 2009/0123825 A1 | 5/2009 | O'Phelan et al. |
| 2009/0158565 A1 | 6/2009 | Poplett |
| 2010/0155362 A1 | 6/2010 | Poplett et al. |
| 2010/0203380 A1 | 8/2010 | O'Phelan et al. |
| 2010/0234911 A1 | 9/2010 | Doffing et al. |
| 2010/0297507 A1 | 11/2010 | Kelley et al. |
| 2011/0082509 A1 | 4/2011 | Root et al. |
| 2011/0134593 A1 | 6/2011 | Root et al. |
| 2011/0217591 A1* | 9/2011 | Heo .............. H01M 50/536 429/211 |
| 2012/0015236 A1 | 1/2012 | Spare |
| 2012/0143271 A1 | 6/2012 | Root et al. |
| 2012/0151725 A1 | 6/2012 | Sherwood |
| 2013/0073004 A1 | 3/2013 | Root et al. |
| 2013/0143109 A1* | 6/2013 | Kim .............. H01M 50/54 429/178 |
| 2013/0316195 A1 | 11/2013 | Root et al. |
| 2014/0050959 A1 | 2/2014 | Ryu et al. |
| 2014/0106206 A1 | 4/2014 | Kwon et al. |
| 2014/0120397 A1 | 5/2014 | Kim et al. |
| 2014/0147708 A1 | 5/2014 | Root et al. |
| 2014/0255762 A1 | 9/2014 | Lee et al. |
| 2015/0086842 A1 | 3/2015 | Kang et al. |
| 2015/0280275 A1 | 10/2015 | Aizawa |
| 2015/0375001 A1 | 12/2015 | Root et al. |
| 2016/0043355 A1 | 2/2016 | Byun et al. |
| 2016/0126597 A1 | 5/2016 | Ryu et al. |
| 2016/0315296 A1* | 10/2016 | Kimura .......... H01M 50/124 |
| 2017/0117508 A1 | 4/2017 | Kim et al. |
| 2017/0250384 A1 | 8/2017 | Kim et al. |
| 2017/0263971 A1 | 9/2017 | O'Phelan et al. |
| 2018/0072165 A1 | 3/2018 | Matsumoto |
| 2019/0006637 A1* | 1/2019 | An .............. H01M 50/107 |
| 2019/0027775 A1 | 1/2019 | O'Phelan et al. |
| 2019/0214608 A1 | 7/2019 | Kimura et al. |
| 2019/0348718 A1 | 11/2019 | Kawai |
| 2020/0069951 A1 | 3/2020 | Root et al. |
| 2022/0093974 A1 | 3/2022 | Kawai |
| 2022/0149462 A1 | 5/2022 | Kimura et al. |
| 2022/0192568 A1* | 6/2022 | Lee .............. A61B 5/24 |

FOREIGN PATENT DOCUMENTS

| | | |
|---|---|---|
| CN | 103918106 A | 7/2014 |
| CN | 104272492 A | 1/2015 |
| CN | 105374978 A | 3/2016 |
| CN | 106067519 A | 11/2016 |
| EP | 2 365 562 A2 | 9/2011 |
| JP | 2006-512745 A | 4/2006 |
| JP | 2014-522096 A | 8/2014 |
| JP | 2014-523102 A | 9/2014 |
| JP | 2015-519691 A | 7/2015 |
| JP | 2015-191796 A | 11/2015 |
| JP | WO2016/103127 A1 | 6/2016 |
| JP | 2016-207652 A | 12/2016 |
| JP | 2018-529212 A | 10/2018 |
| KR | 10-2013-0124921 A | 11/2013 |
| KR | 10-2014-0090341 A | 7/2014 |
| KR | 10-1405012 B1 | 7/2014 |
| KR | 10-2015-0049458 A | 5/2015 |
| KR | 10-2015-0100017 A | 9/2015 |
| KR | 10-2017-0047756 A | 5/2017 |
| KR | 10-2017-0101007 A | 9/2017 |
| KR | 10-2017-0104827 A | 9/2017 |
| KR | 10-2017-0110869 A | 10/2017 |
| KR | 10-2018-0062874 A | 6/2018 |
| WO | WO 2018/173751 A1 | 9/2018 |

OTHER PUBLICATIONS

Dongguan SUM Electronics Technology Co, "Simple Description of Curved Battery", 2023, https://www.sum-battery.com/news/simple-description-of-curved-battery-71853472.html (Year: 2023).*

Crazell, "Curved battery 282421", https://www.crazell.com/product/curved-battery-282421/ (Year: 2025).*

International Search Report (PCT/ISA/210) issued in PCT/KR2020/010333 mailed on Nov. 9, 2020.

Extended European Search Report for European Application No. 20855018.6, dated Oct. 4, 2022.

* cited by examiner

SECONDARY BATTERY, METHOD FOR MANUFACTURING THE SECONDARY BATTERY, AND BATTERY PACK COMPRISING THE SECONDARY BATTERY

CROSS-REFERENCE TO RELATED APPLICATION

The present application claims the benefit of the priority of Korean Patent Application No. 10-2019-0102027, filed on Aug. 20, 2019, which is hereby incorporated by reference in its entirety.

TECHNICAL FIELD

The present invention relates to a secondary battery, a method for manufacturing the secondary battery, and a battery pack comprising the secondary battery, and more particularly, to a secondary battery having large capacity while being maintained in curved shape at the time of manufacture as it is, a method for manufacturing the secondary battery, and a battery pack comprising the secondary battery.

BACKGROUND ART

In general, a secondary battery that is repetitively chargeable and dischargeable has a regular shape such as a rectangular parallelepiped shape, a cylindrical shape, and the like. However, as electronic devices are diversified in shape, and the need to maximize utilization of an internal space of such an electronic device increases, the shape of the secondary battery mounted inside the electronic device is also required to be atypical, unlike the related art.

As an example of the secondary battery having the atypical shape, a secondary battery having a curved surface may be mentioned. According to the related art, after manufacturing a secondary battery, one surface or both surfaces of the secondary battery is/are pressed through a jig having a curved surface to manufacture a secondary battery having a curved shape.

However, according to the related art, even if the secondary battery having the curved surface is manufactured, the curved surface is not maintained in shape and is unfolded by stress or restoring force existing in the secondary battery. Particularly, the smaller a curvature radius of the curved surface, the longer a length of the secondary battery, and the thicker a thickness of the secondary battery, the greater tendency of the unfolding of the curved surface formed on the secondary battery. This has acted as an obstacle in manufacturing the secondary battery having the shape with a higher degree of freedom.

DISCLOSURE OF THE INVENTION

Technical Problem

Accordingly, an object of the present invention for solving the above problem is to solve the problem of unfolding of a curved surface formed on a secondary battery by stress or restoring force inside a secondary battery.

In addition, another object of the present invention for solving the above problem is to manufacture a secondary battery having a shape with a degree of freedom greater than that of the secondary battery according to a related art.

Technical Solution

According to a first aspect of the present invention for achieving the above object, a secondary battery comprises: an electrode assembly having a structure in which a plurality of electrodes and a plurality of separators are alternately disposed, wherein each of the electrodes comprises: a body part configured to form a body of the electrode; and an electrode tab protruding from the body part in one direction, wherein the electrode has a sheet structure, wherein each of a top surface and a bottom surface of the body part of the electrode is provided as a flat surface, wherein a circumferential surface of the body part of each electrode includes at least a first side having a flat area and a second side having a curved area, and wherein the plurality of electrodes are stacked so that areas, which have shapes corresponding to each other, of the flat area and the curved area formed on the circumferential surface of the body part of each of the plurality of electrodes are disposed adjacent to each other, and a curved surface is formed on a portion of a side surface of the electrode assembly defining a thickness of the electrode assembly.

The electrode assembly may comprise: a first radical unit comprising a plurality of first electrodes of the plurality of electrodes and a plurality of first separators of the plurality of separators; a second radical unit comprising a plurality of second electrodes of the plurality of electrodes and a plurality of second separators of the plurality of separators; and a third radical unit comprising a third electrode of the plurality of electrodes and provided between the first radical unit and the second radical unit, wherein the plurality of electrode tabs formed on the plurality of first electrodes may be bonded to each other to form a first electrode tab bundle in the first radical unit, wherein the plurality of electrode tabs formed on the plurality of second electrodes may be bonded to each other to form a second electrode tab bundle in the second radical unit, the electrode tab formed on the third electrode may have a surface area greater than that of each of the electrode tab formed on the first electrode and the electrode tab formed on the second electrode, and wherein a first surface of the electrode tab formed on the third electrode may be bonded to the first electrode tab bundle, and a second surface of the electrode tab formed on the third electrode may be bonded to the second electrode tab bundle.

An area on which the electrode tab formed on the third electrode is bonded to the first electrode tab bundle and an area on which the electrode tab formed on the third electrode is bonded to the second electrode tab bundle may be spaced apart from each other in a direction crossing a direction in which the electrode tab formed on the third electrode protrudes from the body part of the third electrode.

The electrode tab formed on the electrode may be formed on the flat area formed on the circumferential surface of the body part of the electrode.

The electrode tab formed on the electrode may be formed on the curved area formed on the circumferential surface of the body part of the electrode.

The first radical unit may further comprise a plurality of fourth electrodes of the plurality of electrodes, each fourth electrode having a polarity different from each of the first electrodes, the second radical unit may further comprise a plurality of fifth electrodes of the plurality of electrodes, each fifth electrode having a polarity different from each of the second electrodes, the third radical unit may further comprise a sixth electrode of the plurality of electrodes having a polarity different from the third electrode, wherein the plurality of electrode tabs formed on the plurality of fourth electrodes may be bonded to each other to form a fourth electrode tab bundle in the first radical unit, the plurality of electrode tabs formed on the plurality of fifth electrodes may be bonded to each other to form a fifth electrode tab bundle in the second radical unit, the electrode tab formed on the sixth electrode may have a surface area greater than that of each of the electrode tab formed on the fourth electrode and the electrode tab formed on the fifth electrode, wherein a first surface of the electrode tab formed on the sixth electrode may be bonded to the fourth electrode tab bundle, and a second surface of the electrode tab formed on the sixth electrode may be bonded to the fifth electrode tab bundle, and wherein an area on which the electrode tab formed on the sixth electrode is bonded to the fourth electrode tab bundle and an area on which the electrode tab formed on the sixth electrode is bonded to the fifth electrode tab bundle may be spaced apart from each other in a direction crossing a direction in which the electrode tab formed on the sixth electrode protrudes from the body part of the sixth electrode.

According to a second aspect of the present invention for achieving the above object, a method for manufacturing a secondary battery comprises: a preparation step of preparing a plurality of separators and a plurality of electrodes, each of which comprises a body part and an electrode tab protruding from the body part in one direction and having a sheet structure; and a disposition step of disposing the electrodes and the separators to have a structure in which the electrodes and the separators are alternately disposed, wherein a circumferential surface of the body part of each of the electrodes includes at least a first side having a flat area and a second side having a curved area, and wherein, in the disposition step, the electrodes are disposed so that areas, which have shapes corresponding to each other, of the flat area and the curved area, which are formed on the circumferential surface of the body part of each electrode having the sheet structure, are disposed adjacent to each other, a curved surface is formed on a portion of a side surface of the electrode assembly defining a thickness of the electrode assembly.

The electrode tabs formed on the electrodes provided in the preparation step may be formed on the flat areas formed on the circumferential surfaces of the body parts of the electrodes, respectively.

The electrode tabs formed on the electrodes provided in the preparation step may be formed on the curved areas formed on the circumferential surfaces of the body parts of the electrodes, respectively.

The preparation step may comprise a step of preparing a first radical unit comprising a plurality of first electrodes of the plurality of electrodes and a plurality of first separators of the plurality of separators, a second radical unit comprising a plurality of second electrodes or the plurality of electrodes and a plurality of second separators of the plurality of separators, and a third radical unit comprising a third electrode, and wherein the disposition step may comprise a step of disposing the third radical unit between the first radical unit and the second radical unit.

The method may further comprise: a first electrode tab bundle forming step of bonding the electrode tabs of the plurality of first electrodes to each other to form a first electrode tab bundle in the first radical unit; a second electrode tab bundle forming step of bonding the electrode tabs of the plurality of second electrodes to each other to form a second electrode tab bundle in the second radical unit; and a third electrode tab bonding step of bonding a first surface of the electrode tab formed on the third electrode to the first electrode tab bundle while bonding a second surface of the electrode tab formed on the third electrode to the second electrode tab bundle, wherein the electrode tab formed on the third electrode may have a surface area greater than that of each of the electrode tab formed on the first electrode and the electrode tab formed on the second electrode.

After the third electrode tab bonding step, an area on which the electrode tab formed on the third electrode is bonded to the first electrode tab bundle and an area on which the electrode tab formed on the third electrode is bonded to the second electrode tab bundle may be spaced apart from each other in a direction crossing a direction in which the electrode tab formed on the third electrode protrudes from the body part of the third electrode.

The first radical unit may further comprise a plurality of fourth electrodes of the plurality of electrodes, each fourth electrode having a polarity different from each of the first electrodes, the second radical unit may further comprise a plurality of fifth electrodes of the plurality of electrodes, each fifth electrode having a polarity different from each of the second electrodes, and wherein the third radical unit may further comprise a sixth electrode having a polarity different from the third electrode, wherein the method may further comprise: a fourth electrode tab bundle forming step of bonding electrode tabs of the plurality of fourth electrodes to each other to form a fourth electrode tab bundle in the first radical unit; a fifth electrode tab bundle forming step of bonding electrode tabs of the plurality of fifth electrodes to each other to form a fifth electrode tab bundle in the second radical unit; and a sixth electrode tab bonding step of bonding a first surface of the electrode tab formed on the sixth electrode to the fourth electrode tab bundle while bonding a second surface of the electrode tab formed on the sixth electrode to the fifth electrode tab bundle.

According to a third aspect of the present invention for achieving the above object, provided is a battery pack comprising the secondary battery.

Advantageous Effects

According to the present invention, it may be possible to solve the problem of the unfolding of the curved surface formed on the secondary battery due to the stress or the restoring force inside the secondary battery.

In addition, according to the present invention, it may be possible to manufacture a secondary battery having a shape with a degree of freedom greater than that of the secondary battery according to the related art.

MODE FOR CARRYING OUT THE INVENTION

Hereinafter, a structure of a secondary battery according to the present invention will be described with reference to the accompanying drawings.

Secondary Battery

Figure 1:
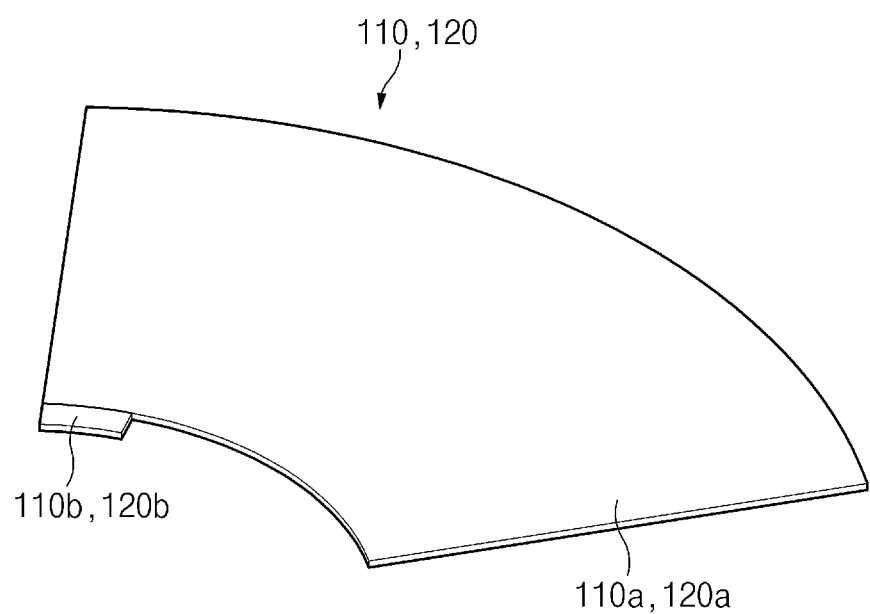
FIG. 1 is a perspective view illustrating a structure of a first electrode and a fourth electrode, which constitute a first radical unit according to a first embodiment of the present invention.
Figure 2:
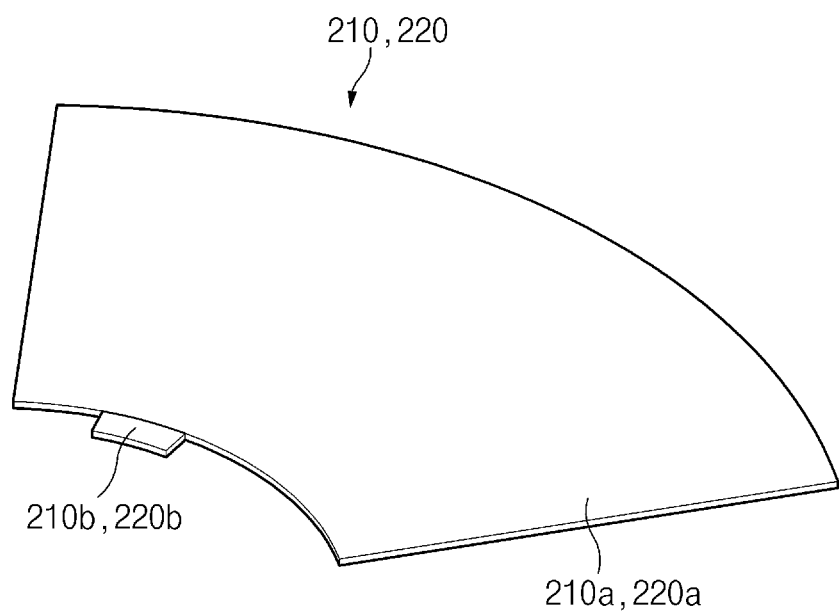
FIG. 2 is a perspective view illustrating a structure of a second electrode and a fifth electrode, which constitute a second radical unit according to the first embodiment of the present invention.
Figure 3:
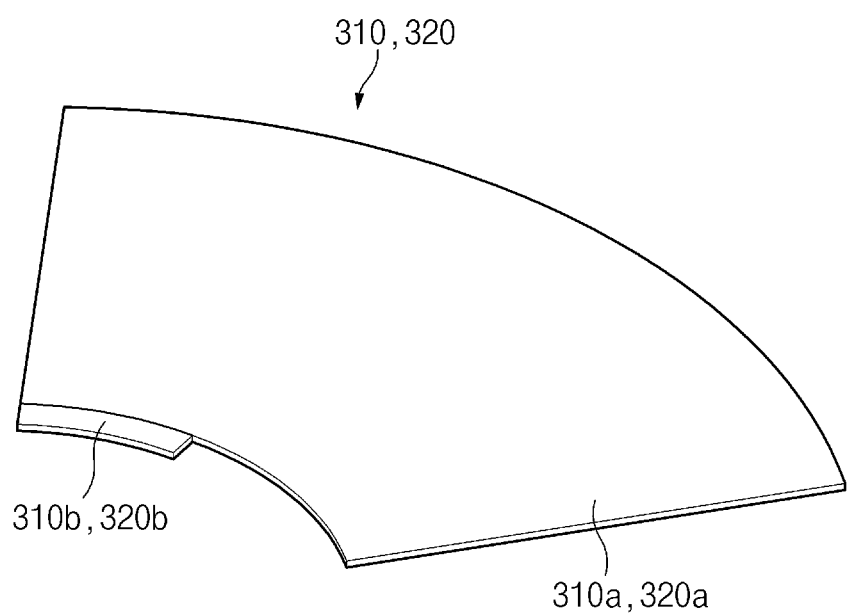
FIG. 3 is a perspective view illustrating a structure of a third electrode and a sixth electrode, which constitute a third radical unit according to the first embodiment of the present invention.
Figure 4:
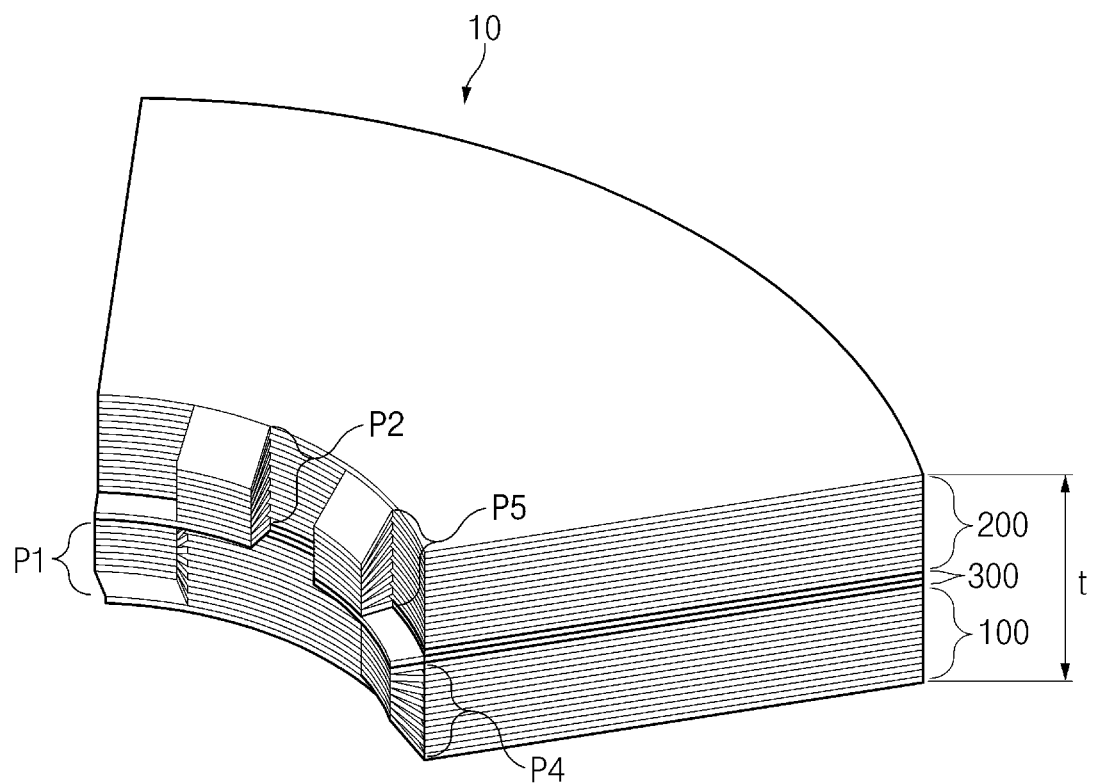
FIG. 4 is a perspective view illustrating an electrode assembly of a secondary battery according to the first embodiment of the present invention.

FIG. 1 is a perspective view illustrating a structure of a first electrode and a fourth electrode, which constitute a first radical unit according to a first embodiment of the present invention, and FIG. 2 is a perspective view illustrating a structure of a second electrode and a fifth electrode, which constitute a second radical unit according to the first embodiment of the present invention. FIG. 3 is a perspective view illustrating a structure of a third electrode and a sixth electrode, which constitute a third radical unit according to the first embodiment of the present invention, and FIG. 4 is a perspective view illustrating an electrode assembly of a secondary battery according to the first embodiment of the present invention.

The secondary battery according to the present invention may comprise an electrode assembly 10. The electrode assembly 10 may have a structure in which a plurality of electrodes and a plurality of separators are alternately disposed. As illustrated in FIG. 4, the electrode assembly 10 may have a predetermined thickness t in a direction in which the plurality of electrodes and the plurality of separators are alternately disposed.

Here, as illustrated in FIGS. 1 to 3, the electrodes 110, 120, 210, 220, 310, and 320 may comprise body parts 110a, 120a, 210a, 220a, 310a, and 320a constituting bodies of the electrodes and electrode tabs 110b, 120b, 210b, 220b, 310b, and 320b protruding from the bodies in one direction. The electrodes according to the present invention may comprise a first electrode 110, a second electrode 210, a third electrode 310, a fourth electrode 120, a fifth electrode 220, and a sixth electrode 320. Also, the first electrode 110 may comprise a first body part 110a and a first electrode tab 110b, the second electrode 210 may comprise a second body part 210a and a second electrode tab 210b, the third electrode 310 may comprise a third body part 310b and a third electrode tab 310b, the fourth electrode 120 may comprises a fourth body part 120a and a fourth electrode tan 120b, the fifth electrode 220 may comprise a fifth body part 220a and a fifth electrode tab 220b, and the sixth electrode tan 330 may comprise a sixth body part 330a and a sixth electrode tab 330b.

The electrode according to the present invention may have a sheet structure. The 'sheet structure' may mean a structure in which a thickness of a side surface is significantly less than that of each of top and bottom surfaces.

Continuously, referring to FIGS. 1 to 4, according to the present invention, each of the top and bottom surfaces of the body parts 110a, 120a, 210a, 220a, 310a, and 320a of the electrodes 110, 120, 210, 220, 310, and 320 of the electrode assembly 10 may be provided as a flat surface. Here, the flat surface may be understood as a concept opposite to a curved surface.

Also, as illustrated in FIGS. 1 to 3, a planer area having a flat surface and a curved area having a curved surface may be formed on circumferential surfaces of the body parts 110a, 120a, 210a, 220a, 310a, and 320a of the electrodes 110, 120, 210, 220, 310, and 320, respectively. FIG. 3 illustrates a case in which the curved area that is recessed concavely may be formed in a left circumferential surface of the body part of the electrode, and the planer area is formed on each of upper and lower circumferential surfaces of the body part of the electrode.

The electrode assembly 10 according to the present invention may have a structure in which the electrodes 10, 120, 210, 220, 310, and 320 are stacked so that areas, which have shapes corresponding to each other, of the flat areas and the curved areas, which are formed on the circumferential surface of each of the body parts 110a, 120a, 210a, 220a, 310a, and 320a, are disposed adjacent to each other. That is, referring to FIGS. 1 to 4, in the plurality of electrodes within the electrode assembly 10, the concavely recessed curved areas of the curved areas of the circumferential surfaces of the electrodes may be disposed adjacent to each other, and the convexly protruding curved areas of the curved areas of the circumferential surfaces of the electrodes may be disposed adjacent to each other.

Thus, according to the present invention, the curved surface having the shape corresponding to the curved area formed on the electrode may be formed on at least a portion of a side surface of the electrode assembly, which defines the thickness t of the electrode assembly 10, and the flat surface having the shape corresponding to the flat area formed on the electrode may be formed on the other portion of the side surface of the electrode assembly.

Therefore, according to the present invention, it may be possible to manufacture the secondary battery having the curved surface without a separate pressing process for forming the curved surface.

Particularly, in the case of the secondary battery having the curved surface according to the related art, the electrode assembly or the secondary battery having the flat surface may be manufactured first, and then, some of the flat surfaces of the secondary battery may be pressed using a jig having a curved surface to form curved surfaces on the secondary battery. As a result, surfaces of the electrodes adjacent to each other inside the electrode assembly may also have curved shapes. However, in this case, since the curved surface of the electrodes artificially formed by the pressing, restoring force acting in a direction in which the curved surface is unfolded again occurs in the electrode assembly. Thus, in the case of the secondary battery having the curved surface, which is manufactured according to the related art, the curved surface is unfolded as the time elapses. It may be understood that a curvature radius of the curved surface formed on the secondary battery increases as the time elapses.

However, in the secondary battery having the curved surface, which is manufactured according to the present invention, since each of the surfaces of the adjacent electrodes, which face each other, is formed as a flat surface, the restoring force acting in the direction in which the curved surface is unfolded again does not occur in the electrode assembly. Thus, in the case of manufacturing the secondary battery having the curved surface according to the present invention, the problem in which the curved surface is unfolded does not occur even after the time elapses. That is, according to the present invention, the curvature radius of the curved surface formed on the secondary battery may be maintained as it is even when the time elapses.

The electrode assembly 10 according to the present invention may comprise a plurality of radical units. That is, as illustrated in FIG. 4, the electrode assembly 10 may comprise a first radical unit 100, a second radical unit 200, and a third radical unit 300 provided between the first radical unit and the second radical unit. That is, the electrode assembly 10 may have a structure in which the first radical unit 100, the third radical unit 300, and the second radical unit 200 are alternately stacked upward. Referring to FIGS. 1 to 4, the first radical unit 100 may comprise a first electrode 110, a fourth electrode 120, and a separator, the second radical unit 200 may comprise a second electrode 210, a fifth electrode 220, and a separator, and the third radical unit 300 may comprise a third electrode 310, a sixth electrode 320, and a separator. Here, the first electrode 110 and the fourth electrode 120 may have polarities different from each other, the second electrode 210 and the fifth electrode 220 may have polarities different from each other, and the third electrode 310 and the sixth electrode 320 may have polarities different from each other.

Referring to FIG. 4, in the electrode assembly 10 of the secondary battery according to the present invention, electrode tabs formed on the plurality of electrodes are bonded to each other in the first radical unit 100 and the second radical unit 200 to form electrode tab bundles.

That is, in the first radical unit 100, a plurality of first electrode tabs formed on a plurality of first electrodes may be bonded to each other to form a first electrode tab bundle P1, and a plurality of fourth electrodes formed on a plurality of fourth electrodes may be bonded to each other to form a fourth electrode tab bundle P4.

Also, in the second radical unit 200, a plurality of second electrode tabs formed on a plurality of second electrodes may be bonded to each other to form a second electrode tab bundle P2, and a plurality of fifth electrodes formed on a plurality of fifth electrodes may be bonded to each other to form a fifth electrode tab bundle P5. Each of the first electrode tab bundle P1, the second electrode tab bundle P2, the fourth electrode tab bundle P4, and the fifth electrode tab bundle P5 may be formed through welding.

Here, referring to FIGS. 3 and 4, one surface (a bottom surface of the third electrode tab in FIG. 4) of the third electrode tab 310b formed on the third electrode 310 may be bonded to the first electrode tab bundle P1, and the other surface (a top surface of the third electrode tab in FIG. 4) of the third electrode tab 310b may be bonded to the second electrode tab bundle P2.

Also, one surface (a bottom surface of the sixth electrode tab in FIG. 4) of the sixth electrode tab 310b formed on the sixth electrode 320 may be bonded to the fourth electrode tab bundle P4, and the other surface (a top surface of the sixth electrode tab in FIG. 4) of the sixth electrode tab 320b may be bonded to the fifth electrode tab bundle P5.

As illustrated in FIGS. 1 to 3, the third electrode tab 310b formed on the third electrode 310 may have a surface area greater than that of each of the first electrode tab 110b formed on the first electrode 110 and the second electrode tab 210b formed on the second electrode 210. Similarly, the sixth electrode tab 320b formed on the sixth electrode 320 may have a surface area greater than that of each of the fourth electrode tab 120b formed on the fourth electrode 120 and the fifth electrode tab 220b formed on the fifth electrode 220.

Figure 5:
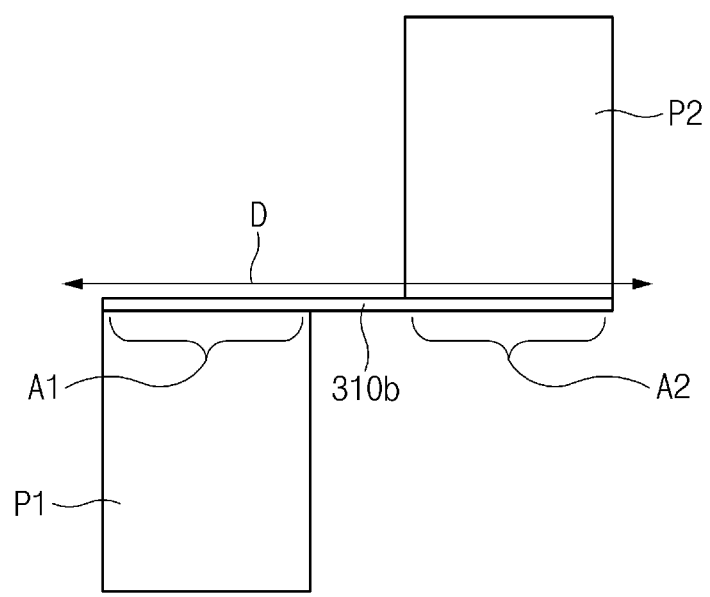
FIG. 5 is a cross-sectional view illustrating a state in which first to third electrode tabs are bonded in the secondary battery according to the present invention.
Figure 6:
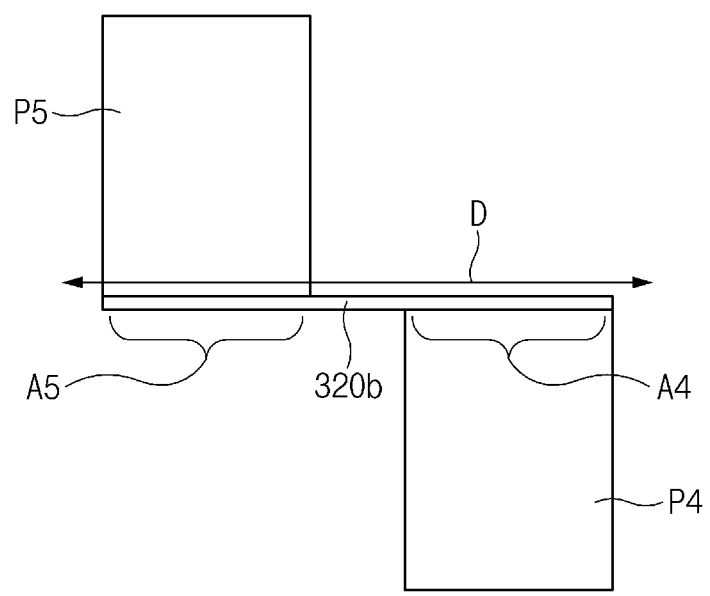
FIG. 6 is a cross-sectional view illustrating a state in which fourth to sixth electrode tabs are bonded in the secondary battery according to the present invention.

FIG. 5 is a cross-sectional view illustrating a state in which the first to third electrode tabs are bonded in the secondary battery according to the present invention, and FIG. 6 is a cross-sectional view illustrating a state in which the fourth to sixth electrode tabs are bonded in the secondary battery according to the present invention.

As described above, the surface area of the third electrode tab may be larger than that of each of the first electrode tab and the area of the second electrode tab. Thus, as illustrated in FIG. 5, an area A1 on which the third electrode tab 310b formed on the third electrode is bonded to the first electrode tab bundle P1 and an area A2 on which the third electrode tab 310b formed on the third electrode is bonded to the second electrode tab bundle P2 may be spaced apart from each other. That is, as illustrated in FIG. 5, the first area A1 and the second area A2 may be spaced apart from each other in a direction D crossing a direction in which the third electrode tab 310b protrudes from the third body part 310a.

According to the present invention, in the process of manufacturing the electrode assembly of the secondary battery, the third electrode tab 310b may also be bonded to the second electrode tab bundle P2 while being bonded to the first electrode tab bundle P1. In this case, when the area A1 bonded to the first electrode tab bundle P1 and the area A2 bonded to the second electrode tab bundle P2 overlap each other, a portion that belongs to the area A1 and the area A2 at the same time may be provided on the third electrode tab 310b. In this case, since all of the process in which the first electrode tab bundle P1 is bonded and the process in which the second electrode tab bundle P2 is bonded are performed on the area that belongs to the area A1 and the area A2 at the same time, the third electrode tab 310b may be significantly deteriorated in durability. Particularly, when the bonding between the third electrode tab 310b and the first electrode tab bundle P1 and the bonding between the third electrode tab 310b and the second electrode tab bundle P2 are performed through the welding, the third electrode tab may be damaged or cut on the area on which the area A1 and the area A2 overlap each other (i.e., an area on which welding of the third electrode tab is performed twice.

Thus, in order to solve the above problem, according to the present invention, the area A1 and the area A2 may be spaced apart from each other. For the same reason as above contents for the area A1 and the area A2, as illustrated in FIG. 6, an area A4 on which the sixth electrode tab 320b formed on the sixth electrode 320 is bonded to the fourth electrode tab bundle P4 and an area A5 on which the sixth electrode tab 320b is bonded to the sixth electrode is bonded to the fifth electrode tab bundle P5 may also be spaced apart from each other in a direction crossing a direction in which the sixth electrode tab 320*b* protrudes from the sixth body part 320*a*.

Referring again to FIGS. 1 to 3, the electrode tabs 110*b*, 120*b*, 210*b*, 220*b*, 310*b*, and 320*b* formed on the electrodes 110, 120, 210, 220, 310, and 320 according to the present invention may protrude from the curved areas formed on the circumferential surfaces of the electrodes, respectively. For example, according to a first embodiment of the present invention, as illustrated in FIGS. 1 to 3, an electrode tab formed on an electrode may be formed on a concavely recessed curved area of a curved area formed on a circumferential surface of a body part of each of electrodes. Therefore, according to the first embodiment of the present invention, in an electrode assembly of the secondary battery, the electrode tab or an electrode tab bundle may be formed on the concavely recessed curved area of side surfaces of the electrode assembly, which define a thickness t (see FIG. 4) of the electrode assembly.

Figure 7:
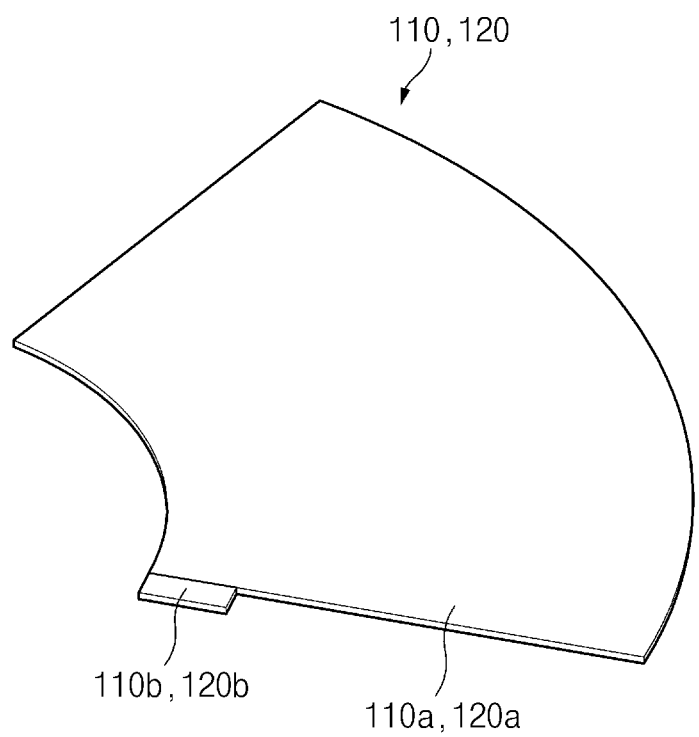
FIG. 7 is a perspective view illustrating a structure of a first electrode and a fourth electrode, which constitute a first radical unit according to a second embodiment of the present invention.
Figure 8:
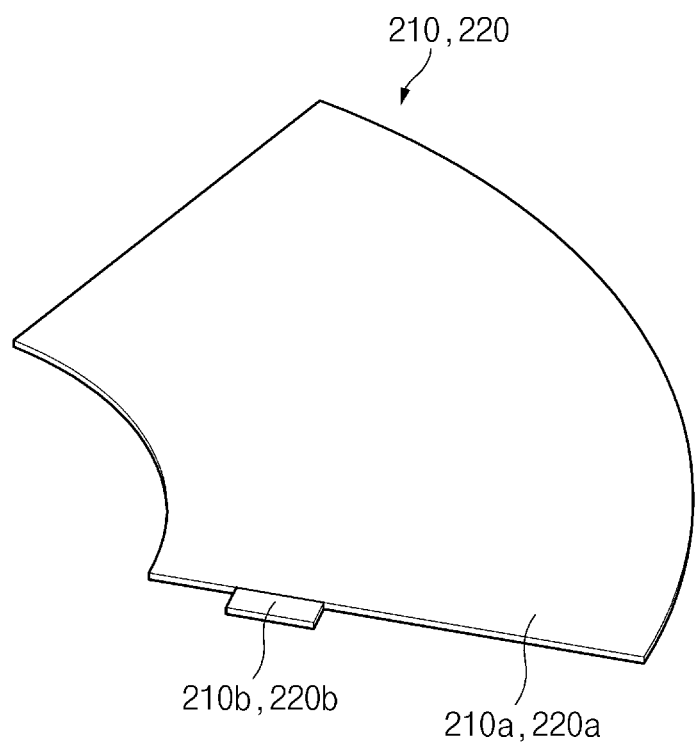
FIG. 8 is a perspective view illustrating a structure of a second electrode and a fifth electrode, which constitute a second radical unit according to the second embodiment of the present invention.
Figure 9:
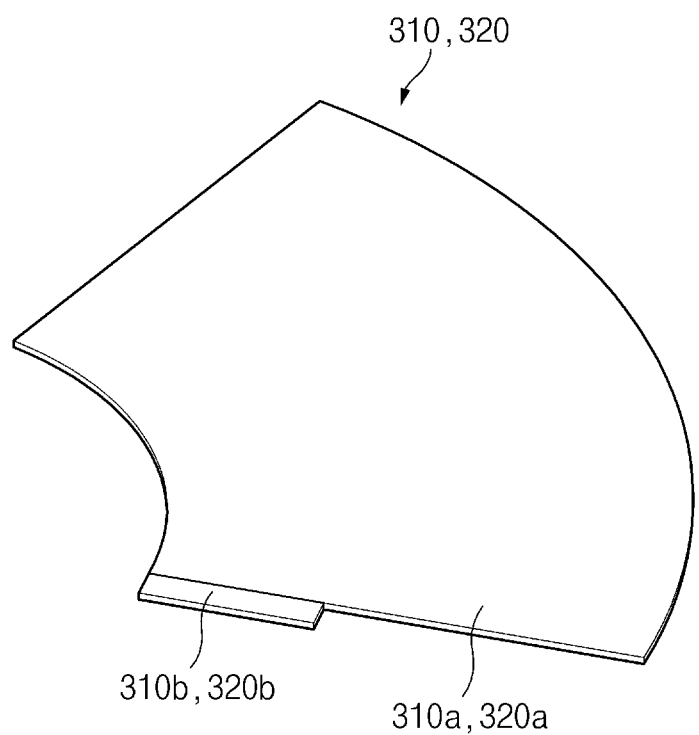
FIG. 9 is a perspective view illustrating a structure of a third electrode and a sixth electrode, which constitute a third radical unit according to the second embodiment of the present invention.
Figure 10:
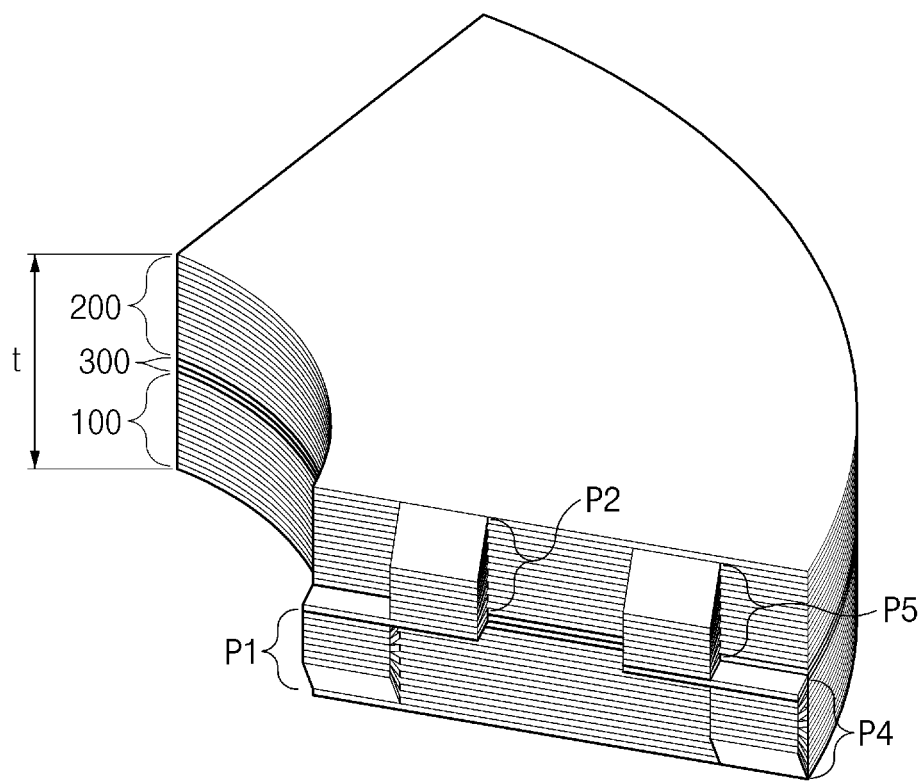
FIG. 10 is a perspective view illustrating an electrode assembly of a secondary battery according to the second embodiment of the present invention.

FIG. 7 is a perspective view illustrating a structure of a first electrode and a fourth electrode, which constitute a first radical unit according to a second embodiment of the present invention, and FIG. 8 is a perspective view illustrating a structure of a second electrode and a fifth electrode, which constitute a second radical unit according to the second embodiment of the present invention. FIG. 9 is a perspective view illustrating a structure of a third electrode and a sixth electrode, which constitute a third radical unit according to the second embodiment of the present invention, and FIG. 10 is a perspective view illustrating an electrode assembly of a secondary battery according to the second embodiment of the present invention.

According to a second embodiment of the present invention, electrode tabs 110*b*, 120*b*, 210*b*, 220*b*, 310*b*, and 320*b* formed on electrodes 110, 120, 210, 220, 310, and 320 may be formed on flat areas of circumferential surfaces of body parts of the electrodes, respectively. Therefore, according to the second embodiment of the present invention, in an electrode assembly of the secondary battery, each of the electrode tabs or electrode tab bundles may be formed on the flat areas of side surfaces of the electrode assembly, which define a thickness t (see FIG. 10) of the electrode assembly.

Figure 11:
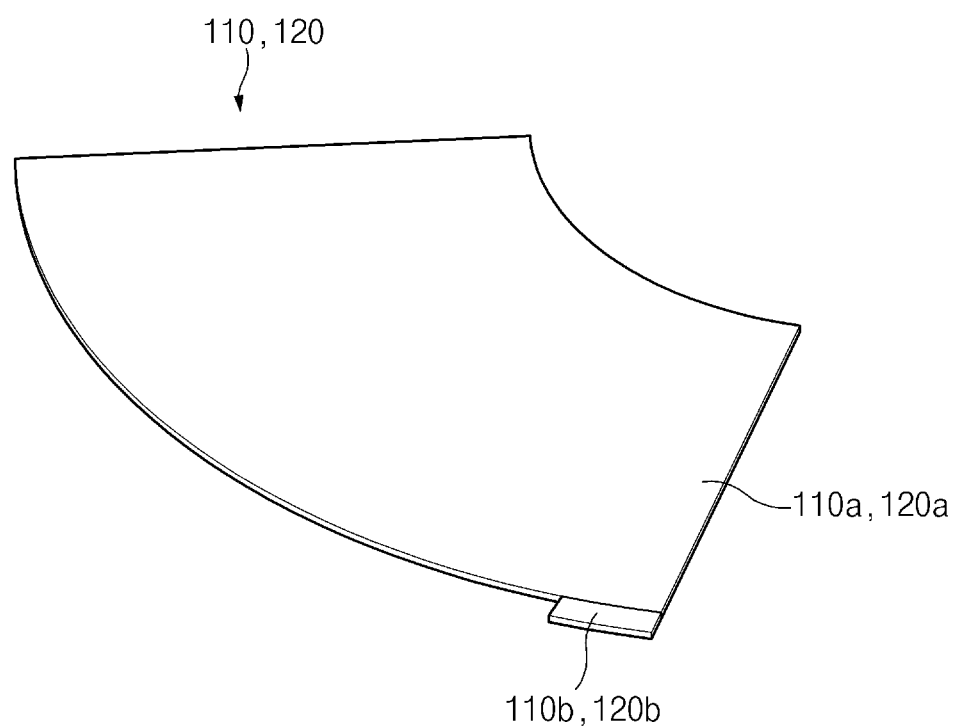
FIG. 11 is a perspective view illustrating a structure of a first electrode and a fourth electrode, which constitute a first radical unit according to a third embodiment of the present invention.
Figure 12:
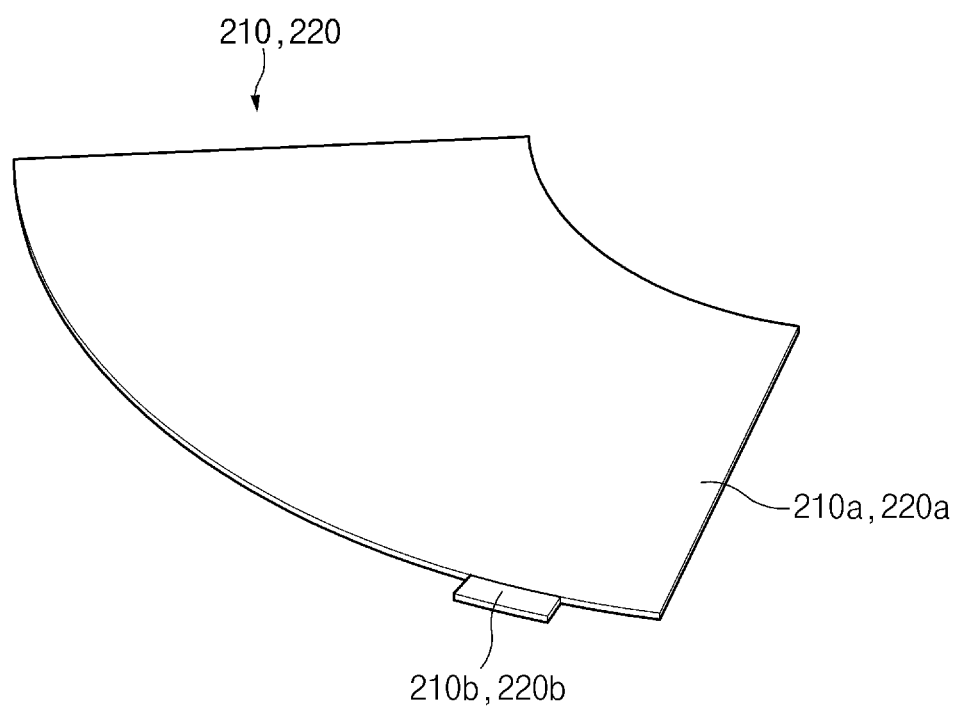
FIG. 12 is a perspective view illustrating a structure of a second electrode and a fifth electrode, which constitute a second radical unit according to the third embodiment of the present invention.
Figure 13:
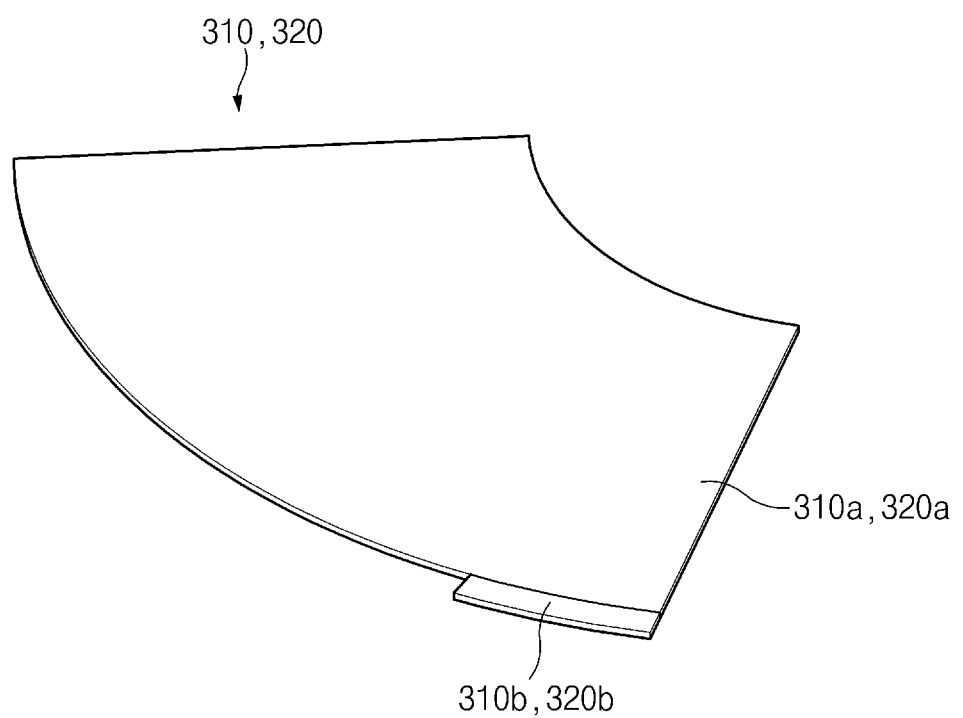
FIG. 13 is a perspective view illustrating a structure of a third electrode and a sixth electrode, which constitute a third radical unit according to the third embodiment of the present invention.
Figure 14:
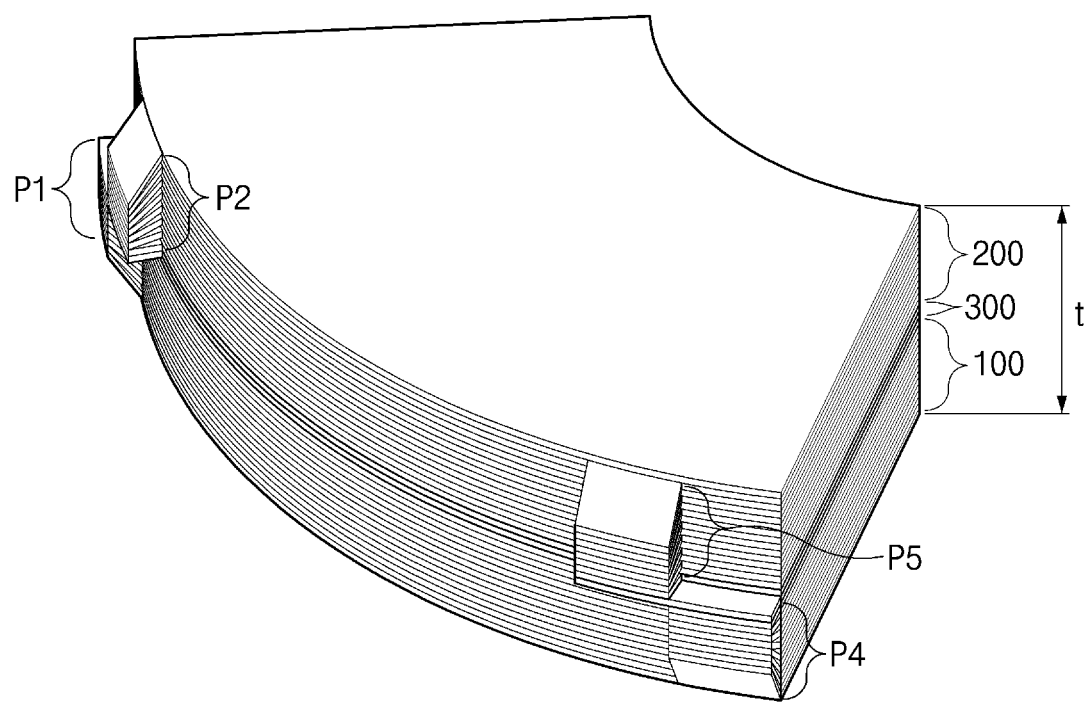
FIG. 14 is a perspective view illustrating an electrode assembly of a secondary battery according to the third embodiment of the present invention.

FIG. 11 is a perspective view illustrating a structure of a first electrode and a fourth electrode, which constitute a first radical unit according to a third embodiment of the present invention, and FIG. 12 is a perspective view illustrating a structure of a second electrode and a fifth electrode, which constitute a second radical unit according to the third embodiment of the present invention. FIG. 13 is a perspective view illustrating a structure of a third electrode and a sixth electrode, which constitute a third radical unit according to the third embodiment of the present invention, and FIG. 14 is a perspective view illustrating an electrode assembly of a secondary battery according to the third embodiment of the present invention.

According to a third embodiment of the present invention, electrode tabs 110*b*, 120*b*, 210*b*, 220*b*, 310*b*, and 320*b* formed on electrodes 110, 120, 210, 220, 310, and 320 may be formed on convexly protruding curved areas of curved areas formed on circumferential surfaces of body parts 110*a*, 120*a*, 210*a*, 220*a*, 310*a*, and 320*a* of the electrodes, respectively. Therefore, according to the third embodiment of the present invention, in an electrode assembly of the secondary battery, each of the electrode tabs or an electrode tab bundles may be formed on the convexly protruding curved area of side surfaces of the electrode assembly, which define a thickness t (see FIG. 14) of the electrode assembly.

Battery Pack

A battery pack according to the present invention may comprise a secondary battery. Description of the secondary battery and the electrode assembly constituting the secondary battery will be denoted from the above description.

Method for Manufacturing Secondary Battery

A method for manufacturing a secondary battery according to the present invention may comprise a preparation step of preparing a plurality of separators and a plurality of electrodes, each of which comprises a body part and an electrode tab protruding from the body part in one direction and has a sheet structure. Also, the method may further comprise a disposition step of disposing the electrodes and the separators to have a structure in which the electrodes and the separators are alternately disposed.

Here, according to the present invention, in the disposition step, the electrodes may be disposed so that areas, which have shapes corresponding to each other, of a flat area and a curved area, which are formed on a circumferential surface of the body part of each electrode having the sheet structure, are disposed adjacent to each other. Thus, in the disposition step, a curved surface may be formed on at least a portion of side surfaces of the electrode assembly, which define a thickness of the electrode assembly formed by alternately disposing the electrodes and the separators.

According to an example of the method of manufacturing the secondary battery according to the present invention, the electrode tabs formed on the electrodes provided in the preparation step may be formed on the flat areas formed on the circumferential surfaces of the body parts of the electrodes, respectively.

Alternatively, according to another example of the method of manufacturing the secondary battery according to the present invention, the electrode tabs formed on the electrodes provided in the preparation step may be formed on the curved areas formed on the circumferential surfaces of the body parts of the electrodes, respectively. For example, each of the electrode tabs may be formed on the concavely curved area of the curved area formed on the circumferential surface of the body of each of the electrodes. Alternatively, each of the electrode tabs may be formed on the convexly protruding curved area of the curved area formed on the circumferential surface of the electrode body of each of the electrodes.

According to the present invention, the preparation step comprises a step of preparing a first radical unit 100 (see FIG. 4) comprising a first electrode 110 (see FIG. 1) and a separator, a second radical unit 200 (see FIG. 4) comprising a second electrode 210 (see FIG. 2) and a separator, and a third radical unit 300 (see FIG. 4) comprising a third electrode 310. Also, according to the present invention, the disposition step comprises a step of disposing the third radical unit between the first radical unit and the second radical unit.

Also, the method for manufacturing the secondary battery according to the present invention may further comprise a first electrode tab bundle forming step of bonding the electrode tabs of the plurality of first electrodes to each other to form a first electrode tab bundle in the first radical unit, a second electrode tab bundle forming step of bonding the electrode tabs of the plurality of second electrodes to each other to form a second electrode tab bundle in the second radical unit, and a third electrode tab bonding step of bonding the other surface of a third electrode tab to the second electrode tab bundle while bonding one surface of the third electrode tab to the first electrode tab bundle. Here, a surface area of the electrode tab formed on the third electrode may be greater than that of each of the electrode tab formed on the first electrode and the electrode tab formed on the second electrode.

Also, after the third electrode tab bonding step, an area A1 (see FIG. 5) on which the electrode tab formed on the third electrode is bonded to the first electrode tab bundle and an area A2 (see FIG. 5) on which the electrode tab formed on the third electrode is bonded to the second electrode tab bundle may be spaced apart from each other in a direction crossing a direction in which the electrode tab formed on the third electrode protrudes from the body part of the third electrode.

The first radical unit may further comprise a fourth electrode having a polarity different from that of the first electrode, the second radical unit may further comprise a fifth electrode having a polarity different from that of the second electrode, and the third radical unit may further comprise a sixth electrode having a polarity different from that of the third electrode.

Here, the method for manufacturing the secondary battery according to the present invention may further comprise a fourth electrode tab bundle forming step of bonding electrode tabs of the plurality of fourth electrodes to each other to form a fourth electrode tab bundle in the first radical unit, a fifth electrode tab bundle forming step of bonding electrode tabs of the plurality of fifth electrodes to each other to form a fifth electrode tab bundle in the second radical unit, and a sixth electrode tab bonding step of bonding the other surface of an electrode tab of a sixth electrode to the fifth electrode tab bundle while bonding one surface of the electrode tab of the sixth electrode to the fourth electrode tab bundle. Here, a surface area of the electrode tab formed on the sixth electrode may be greater than that of each of the electrode tab formed on the fourth electrode and the electrode tab formed on the fifth electrode.

Also, after the sixth electrode tab bonding step, an area A4 (see FIG. 6) on which the electrode tab formed on the sixth electrode is bonded to the fourth electrode tab bundle and an area A5 (see FIG. 6) on which the electrode tab formed on the sixth electrode is bonded to the fifth electrode tab bundle may be spaced apart from each other in a direction crossing a direction in which the electrode tab formed on the sixth electrode protrudes from the body part of the sixth electrode.

While the embodiments of the present invention have been described with reference to the specific embodiments, it will be apparent to those skilled in the art that various changes and modifications may be made without departing from the spirit and scope of the invention as defined in the following claims.

DESCRIPTION OF THE SYMBOLS

10: Electrode assembly
100: First radical unit
110: First electrode
110a: First body part
110b: First electrode tab
120: Fourth electrode
120a: Fourth body part
120b: Fourth electrode tab
200: Second radical unit
210: Second electrode
210a: Second body part
210b: Second electrode tab
220: Fifth electrode
220a: Fifth body part
220b: Fifth electrode tab
300: Third radical unit
310: Third electrode
310a: Third body part
310b: Third electrode tab
320: Sixth electrode
320a: Sixth body part
320b: Sixth electrode tab
P1: First electrode tab bundle
P2: Second electrode tab bundle
P4: Fourth electrode tab bundle
P5: Fifth electrode tab bundle
A1, A2, A4, A5: Bonding area
t: Thickness of electrode assembly

The invention claimed is:

1. A secondary battery comprising:
an electrode assembly having a structure in which a plurality of electrodes and a plurality of separators are alternately disposed,
wherein each of the electrodes comprises:
a body part configured to form a body of the electrode; and
an electrode tab protruding from the body part in one direction,
wherein the electrode has a planar, arcuate sheet structure,
wherein each of a top surface and a bottom surface of the body part of the electrode is provided as a flat surface,
wherein a circumferential surface of the body part of each of the electrodes includes at least a first side having a flat area and a second side having a curved area, and
wherein the plurality of electrodes are stacked so that areas, which have shapes corresponding to each other, of the flat area and the curved area formed on the circumferential surface of the body part of each of the plurality of electrodes are disposed adjacent to each other, and a curved surface is formed on a portion of a side surface of the electrode assembly defining a thickness of the electrode assembly.

2. The secondary battery of claim 1, wherein the electrode assembly comprises:
a first radical unit comprising a plurality of first electrodes of the plurality of electrodes and a plurality of first separators of the plurality of separators;
a second radical unit comprising a plurality of second electrodes of the plurality of electrodes and a plurality of second separators of the plurality of separators; and
a third radical unit comprising a third electrode of the plurality of electrodes and provided between the first radical unit and the second radical unit,
wherein the plurality of electrode tabs formed on the plurality of first electrodes are bonded to each other to form a first electrode tab bundle in the first radical unit,
wherein the plurality of electrode tabs formed on the plurality of second electrodes are bonded to each other to form a second electrode tab bundle in the second radical unit,
wherein the electrode tab formed on the third electrode has a surface area greater than that of each of the electrode tab formed on the first electrode and the electrode tab formed on the second electrode, and
wherein a first surface of the electrode tab formed on the third electrode is bonded to the first electrode tab bundle, and a second surface of the electrode tab formed on the third electrode is bonded to the second electrode tab bundle.

3. The secondary battery of claim 2, wherein an area on which the electrode tab formed on the third electrode is bonded to the first electrode tab bundle and an area on which the electrode tab formed on the third electrode is bonded to the second electrode tab bundle are spaced apart from each other in a direction crossing a direction in which the electrode tab formed on the third electrode protrudes from the body part of the third electrode.

4. The secondary battery of claim 1, wherein the electrode tab formed on the electrode is formed on the flat area formed on the circumferential surface of the body part of the electrode.

5. The secondary battery of claim 1, wherein the electrode tab formed on the electrode is formed on the curved area formed on the circumferential surface of the body part of the electrode.

6. The secondary battery of claim 2, wherein the first radical unit further comprises a plurality of fourth electrodes of the plurality of electrodes, each fourth electrode having a polarity different from each of the first electrodes,
wherein the second radical unit further comprises a plurality of fifth electrodes of the plurality of electrodes, each fifth electrode having a polarity different from each of the second electrodes,
wherein the third radical unit further comprises a sixth electrode of the plurality of electrodes and having a polarity different from the third electrode,
wherein the plurality of electrode tabs formed on the plurality of fourth electrodes are bonded to each other to form a fourth electrode tab bundle in the first radical unit,
wherein the plurality of electrode tabs formed on the plurality of fifth electrodes are bonded to each other to form a fifth electrode tab bundle in the second radical unit,
wherein the electrode tab formed on the sixth electrode has a surface area greater than that of each of the electrode tab formed on the fourth electrode and the electrode tab formed on the fifth electrode,
wherein a first surface of the electrode tab formed on the sixth electrode is bonded to the fourth electrode tab bundle, and a second surface of the electrode tab formed on the sixth electrode is bonded to the fifth electrode tab bundle, and
wherein an area on which the electrode tab formed on the sixth electrode is bonded to the fourth electrode tab bundle and an area on which the electrode tab formed on the sixth electrode is bonded to the fifth electrode tab bundle are spaced apart from each other in a direction crossing a direction in which the electrode tab formed on the sixth electrode protrudes from the body part of the sixth electrode.

7. A method for manufacturing a secondary battery, the method comprising:
a preparation step of preparing a plurality of separators and a plurality of electrodes, each of which comprises a body part and an electrode tab protruding from the body part in one direction and having a planar, arcuate sheet structure; and
a disposition step of disposing the electrodes and the separators to have a structure in which the electrodes and the separators are alternately disposed,
wherein a circumferential surface of the body part of each of the electrodes includes at least a first side having a flat area and a second side having a curved area, and
wherein, in the disposition step, the electrodes are disposed so that areas, which have shapes corresponding to each other, of the flat area and the curved area, which are formed on the circumferential surface of the body part of each electrode having the sheet structure, are disposed adjacent to each other, a curved surface is formed on a portion of a side surface of the electrode assembly defining a thickness of the electrode assembly.

8. The method of claim 7, wherein the electrode tabs formed on the electrodes provided in the preparation step are formed on the flat areas formed on the circumferential surfaces of the body parts of the electrodes, respectively.

9. The method of claim 7, wherein the electrode tabs formed on the electrodes provided in the preparation step are formed on the curved areas formed on the circumferential surfaces of the body parts of the electrodes, respectively.

10. The method of claim 7, wherein the preparation step comprises a step of preparing a first radical unit comprising a plurality of first electrodes of the plurality of electrodes and a plurality of first separators of the plurality of separators, a second radical unit comprising a plurality of second electrodes of the plurality of electrodes and a plurality second separators of the plurality of separators, and a third radical unit comprising a third electrode, and
wherein the disposition step comprises a step of disposing the third radical unit between the first radical unit and the second radical unit.

11. The method of claim 10, further comprising:
a first electrode tab bundle forming step of bonding the electrode tabs of the plurality of first electrodes to each other to form a first electrode tab bundle in the first radical unit;
a second electrode tab bundle forming step of bonding the electrode tabs of the plurality of second electrodes to each other to form a second electrode tab bundle in the second radical unit; and
a third electrode tab bonding step of bonding a first surface of the electrode tab formed on the third electrode to the first electrode tab bundle while bonding a second surface of the electrode tab formed on the third electrode to the second electrode tab bundle,
wherein the electrode tab formed on the third electrode has a surface area greater than that of each of the electrode tab formed on the first electrode and the electrode tab formed on the second electrode.

12. The method of claim 11, wherein, after the third electrode tab bonding step, an area on which the electrode tab formed on the third electrode is bonded to the first electrode tab bundle and an area on which the electrode tab formed on the third electrode is bonded to the second electrode tab bundle are spaced apart from each other in a direction crossing a direction in which the electrode tab formed on the third electrode protrudes from the body part of the third electrode.

13. The method of claim 10, wherein the first radical unit further comprises a plurality of fourth electrodes of the plurality of electrodes and having a polarity different from each of the first electrodes,
wherein the second radical unit further comprises a plurality of fifth electrodes of the plurality of electrodes and having a polarity different from each of the second electrodes, and
wherein the third radical unit further comprises a sixth electrode having a polarity different from the third electrode,
wherein the method further comprises:

a fourth electrode tab bundle forming step of bonding electrode tabs of the plurality of fourth electrodes to each other to form a fourth electrode tab bundle in the first radical unit;
a fifth electrode tab bundle forming step of bonding electrode tabs of the plurality of fifth electrodes to each other to form a fifth electrode tab bundle in the second radical unit; and
a sixth electrode tab bonding step of bonding a first surface of the electrode tab formed on the sixth electrode to the fourth electrode tab bundle while bonding a second surface of the electrode tab formed on the sixth electrode to the fifth electrode tab bundle.

14. A battery pack comprising the secondary battery of claim 1.

* * * * *